(12) United States Patent
Wang et al.

(10) Patent No.: US 10,180,949 B2
(45) Date of Patent: Jan. 15, 2019

(54) METHOD AND APPARATUS FOR INFORMATION SEARCHING

(71) Applicant: BAIDU ONLINE NETWORK TECHNOLOGY (BEIJING) CO., LTD., Beijing (CN)

(72) Inventors: Zhen Wang, Beijing (CN); Na Zhang, Beijing (CN); Kai Chen, Beijing (CN); Wenbo Yang, Beijing (CN); Xi Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 288 days.

(21) Appl. No.: 14/969,405

(22) Filed: Dec. 15, 2015

(65) Prior Publication Data

US 2016/0321301 A1  Nov. 3, 2016

(30) Foreign Application Priority Data

Apr. 28, 2015  (CN) .......................... 2015 1 0208523

(51) Int. Cl.
  *G06F 7/00*  (2006.01)
  *G06F 17/30*  (2006.01)
  *H04N 5/232*  (2006.01)
(52) U.S. Cl.
  CPC .. *G06F 17/30247* (2013.01); *G06F 17/30554* (2013.01); *H04N 5/23216* (2013.01); *H04N 5/23222* (2013.01)

(58) Field of Classification Search
  CPC ......... G06F 17/30247; G06F 17/30554; G06F 17/3005; G06F 17/30244; G06F 17/30799;
  (Continued)

(56) References Cited

U.S. PATENT DOCUMENTS 6,774,917 B1 * 8/2004 Foote ................ G06F 17/30814
  707/E17.028
8,326,354 B2 * 12/2012 Ahn ........................ G06Q 30/06
  455/550.1
(Continued)

FOREIGN PATENT DOCUMENTS

CN  101329677 A  12/2008
JP  H10254904 A  9/1998
(Continued)

OTHER PUBLICATIONS

Korean Patent Application No. 10-2015-0163953 Office Action dated Jun. 21, 2017, with English translation, 8 pages.
(Continued)

*Primary Examiner* — Mohammed R Uddin
(74) *Attorney, Agent, or Firm* — Lathrop Gage LLP

(57) ABSTRACT

The present invention provides a method and an apparatus for information searching. The method includes: displaying a shooting interface for image search, and displaying guide information in the shooting interface; obtaining an image shot according to the guide information; and obtaining a search result according to the image shot and displaying the search result. With the present method for information searching, an accuracy rate of the image search may be improved, and requirements of a user may be better satisfied.

7 Claims, 14 Drawing Sheets displaying a shooting interface for image search, and displaying guide information in the shooting interface — S11 obtaining an image shot according to the guide information — S12 obtaining a search result according to the image shot and displaying the search result — S13

(58) Field of Classification Search
CPC .......... G06F 17/30843; H04N 5/23216; H04N 5/23222
USPC .................. 707/722, 737, 759, 708, 999.003
See application file for complete search history.

(56) References Cited

U.S. PATENT DOCUMENTS

| | | | |
|---|---|---|---|
| 8,332,429 B2* | 12/2012 | Poirier | G06F 17/30241 707/781 |
| 9,164,546 B2* | 10/2015 | Sirpal | G06F 3/1438 |
| 2002/0032677 A1* | 3/2002 | Morgenthaler | G06F 17/30781 |
| 2003/0231241 A1* | 12/2003 | Iida | H04N 1/00127 348/207.99 |
| 2004/0207730 A1* | 10/2004 | Imai | H04N 1/00278 348/207.1 |
| 2007/0172155 A1* | 7/2007 | Guckenberger | G06F 17/30247 382/305 |
| 2007/0286488 A1* | 12/2007 | Fukuda | G06K 9/00228 382/190 |
| 2009/0171576 A1* | 7/2009 | Kim | G01C 21/3632 701/533 |
| 2010/0195912 A1* | 8/2010 | Nakada | G06T 11/00 382/190 |
| 2010/0198803 A1* | 8/2010 | Miyazaki | G06F 17/30265 707/706 |
| 2010/0287502 A1* | 11/2010 | Ito | G06F 17/30247 715/810 |
| 2011/0025873 A1* | 2/2011 | Wang | G06F 17/30247 348/222.1 |
| 2011/0050909 A1* | 3/2011 | Ellenby | G03B 17/24 348/207.1 |
| 2011/0102621 A1* | 5/2011 | Kim | H04N 5/23216 348/222.1 |
| 2011/0125735 A1* | 5/2011 | Petrou | G06F 17/30256 707/723 |
| 2011/0184950 A1* | 7/2011 | Skaff | G06F 17/30265 707/737 |
| 2011/0282906 A1* | 11/2011 | Wong | G06F 17/30831 707/780 |
| 2012/0033070 A1* | 2/2012 | Yamazaki | G06K 9/00624 348/135 |
| 2012/0050565 A1* | 3/2012 | Imai | H04N 5/23293 348/224.1 |
| 2013/0054629 A1* | 2/2013 | Takami | G06F 17/30265 707/758 |
| 2015/0103223 A1 | 4/2015 | Park | |

FOREIGN PATENT DOCUMENTS

| | | |
|---|---|---|
| JP | 2002094838 A | 3/2002 |
| KR | 20120065980 A | 6/2012 |
| KR | 20140061892 A | 5/2014 |
| KR | 20150043948 A | 4/2015 |

OTHER PUBLICATIONS

Korean Patent Application No. 10-2015-0163953 Office Action dated Oct. 20, 2016, with English translation, 11 pages.

Japanese Patent Application No. 2015-248789 Notification of Reasons for Refusal dated Oct. 4, 2016, with English Translation, 6 pages.

Japanese Patent Application No. 2015-248789 Decision of Refusal dated Jan. 31, 2017, with English Translation, 6 pages.

Chinese Application No. 201510208523.X, First Office Action dated Jul. 25, 2017; 7 pages.

Chinese Application No. 201510208523.X, English Translation of the First Office Action dated Jul. 25, 2017, 8 pages.

* cited by examiner

METHOD AND APPARATUS FOR INFORMATION SEARCHING

CROSS-REFERENCE TO RELATED APPLICATION

This application is based on and claims priority to Chinese Patent Application Serial No. 201510208523.X, filed with the State Intellectual Property Office of P. R. China on Apr. 28, 2015, the entire contents of which are incorporated herein by reference.

FIELD

Embodiments of the present invention generally relate to a data search field, and more particularly, to a method and an apparatus for information searching.

BACKGROUND

With developments of the mobile internet, the use of the search engine has changed. People are no longer satisfied with the conventional text search, but require various search forms, one of which is the image search.

In the related art, when a user performs the image search, the image used therein is an image shot currently. However, the quality of the image shot may be affected due to different photography skills and habits of different persons, which causes negative effects on the accuracy of the image search, thus affecting the relevance of the search result and dissatisfying the user's requirements.

SUMMARY

Embodiments of the present invention seek to solve at least one of the problems existing in the related art to at least some extent.

Accordingly, the present invention provides a method and an apparatus for information searching, which improves an accuracy rate of image search, thus satisfying requirements of a user better.

Embodiments of a first aspect of the present invention provide a method for information searching. The method includes: displaying a shooting interface for image search, and displaying guide information in the shooting interface; obtaining an image shot according to the guide information; and obtaining a search result according to the image shot and displaying the search result.

With the method for information searching according to embodiments of the first aspect of the present invention, by displaying the guide information in the shooting interface, the user can shoot an accurate and effective image according to the guide information, thus improving an accuracy rate of the image search. Furthermore, the search result is obtained according to the image shot, such that the search result in a particular category is displayed to the user, and thus the requirements of the user are better satisfied.

Embodiments of a second aspect of the present invention provide an apparatus for information searching. The apparatus includes a processor and a memory configured to store instructions executable by the processor, in which the processor is configured to display a shooting interface for image search, display guide information in the shooting interface, obtain an image shot according to the guide information, obtain a search result according to the image shot, and display the search result.

With the apparatus for information searching according to embodiments of the second aspect of the present invention, by displaying the guide information in the shooting interface, the user can shoot an accurate and effective image according to the guide information, thus improving an accuracy rate of the image search. Furthermore, the search result is obtained according to the image shot, such that the search result in a particular category is displayed to the user, and thus the requirements of the user are better satisfied.

Embodiments of a third aspect of the present invention provide a non-transitory computer readable storage medium having stored therein instructions that, when executed by a processor of a mobile terminal, causes the mobile terminal to perform the method for information searching described above.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

Above and/or additional aspects and advantages of embodiments of the present invention will become apparent and more readily appreciated from the following descriptions made with reference to the accompanying drawings, in which.

DETAILED DESCRIPTION

Figure 1:
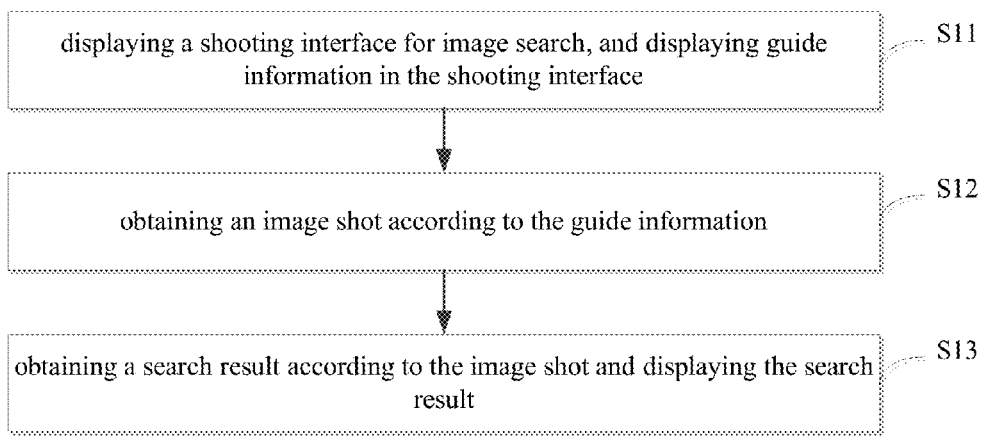
FIG. 1 is a flow chat of a method for information searching according to an embodiment of the present invention.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. On the contrary, the embodiments of the present disclosure comprise all the variants, modifications and their equivalents within the spirit and scope of the present disclosure as defined by the claims.

FIG. 1 is a flow chat of a method for information searching according to an embodiment of the present invention. The method includes following steps.

In step S11, a shooting interface is displayed for image search and guide information is displayed in the shooting interface.

When a user makes a search, shooting identification information (such as a camera sign) is included in a search box. After the user clicks the shooting identification information, an image search mode is started, and a shooting interface is displayed for the image search.

The image used for search may be an image shot currently. For example, the user may shoot the image via the shooting interface. Or, the image used for search may be an image stored in a photo gallery of the user's mobile terminal. For example, an option button for the photo gallery is included in the shooting interface, and the user can click the option button for selecting the image stored in the photo gallery. In the present embodiment, the image used for search is shot currently.

The guide information includes, but is not limited to, a category of the image to be shot and further guide information corresponding to the category.

Figure 2:
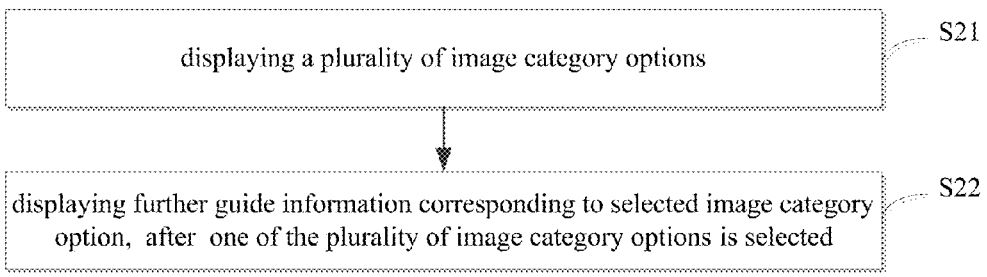
FIG. 2 is a flow chat of displaying guide information according to an embodiment of the present invention.

Referring to FIG. 2, displaying the guide information may include following steps.

In step S21, a plurality of image category options is displayed.

In step S22, after one of the plurality of image category options is selected, the further information corresponding to the selected image category option is displayed.

For example, the plurality of image category options may be first displayed in the shooting interface, and then the further guide information corresponding to one of the plurality of image category options is displayed after the user selects one of the plurality of image category options. The user may select one image category option by clicking the image category option.

For example, the further guide information corresponding to each image category option may be pre-configured, such that the corresponding further guide information can be displayed after the user selects one image category option. The further guide information corresponding to different image category options may be identical or different.

Figure 3:
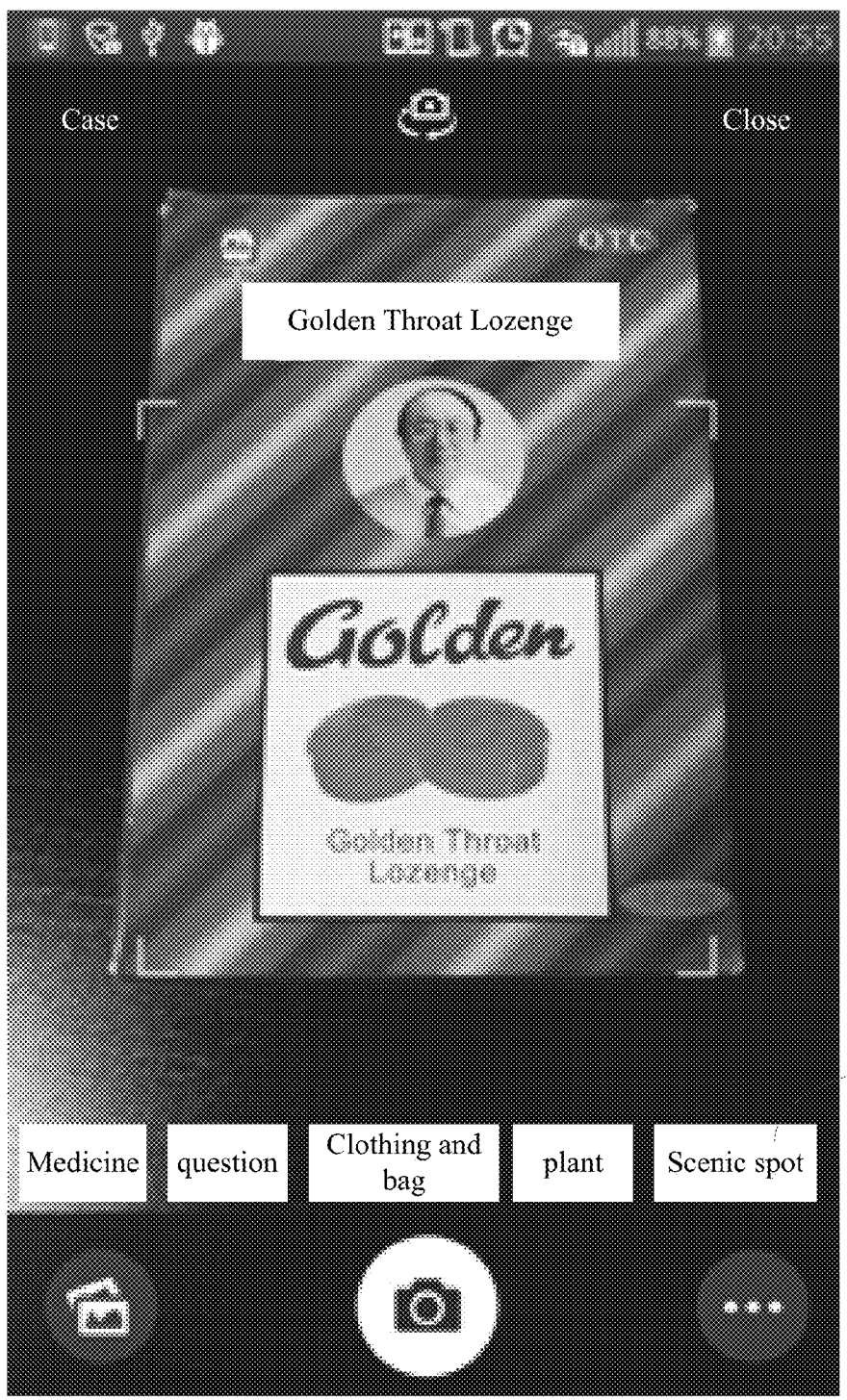
FIG. 3 is a schematic diagram of displaying a plurality of image category options according to an embodiment of the present invention.

As shown in FIG. 3, the plurality of image category options 31 is displayed at the bottom of the shooting interface. In particular, the plurality of image category options includes medicine, question, clothing and bag, plant, and scenic spot.

Figure 4:
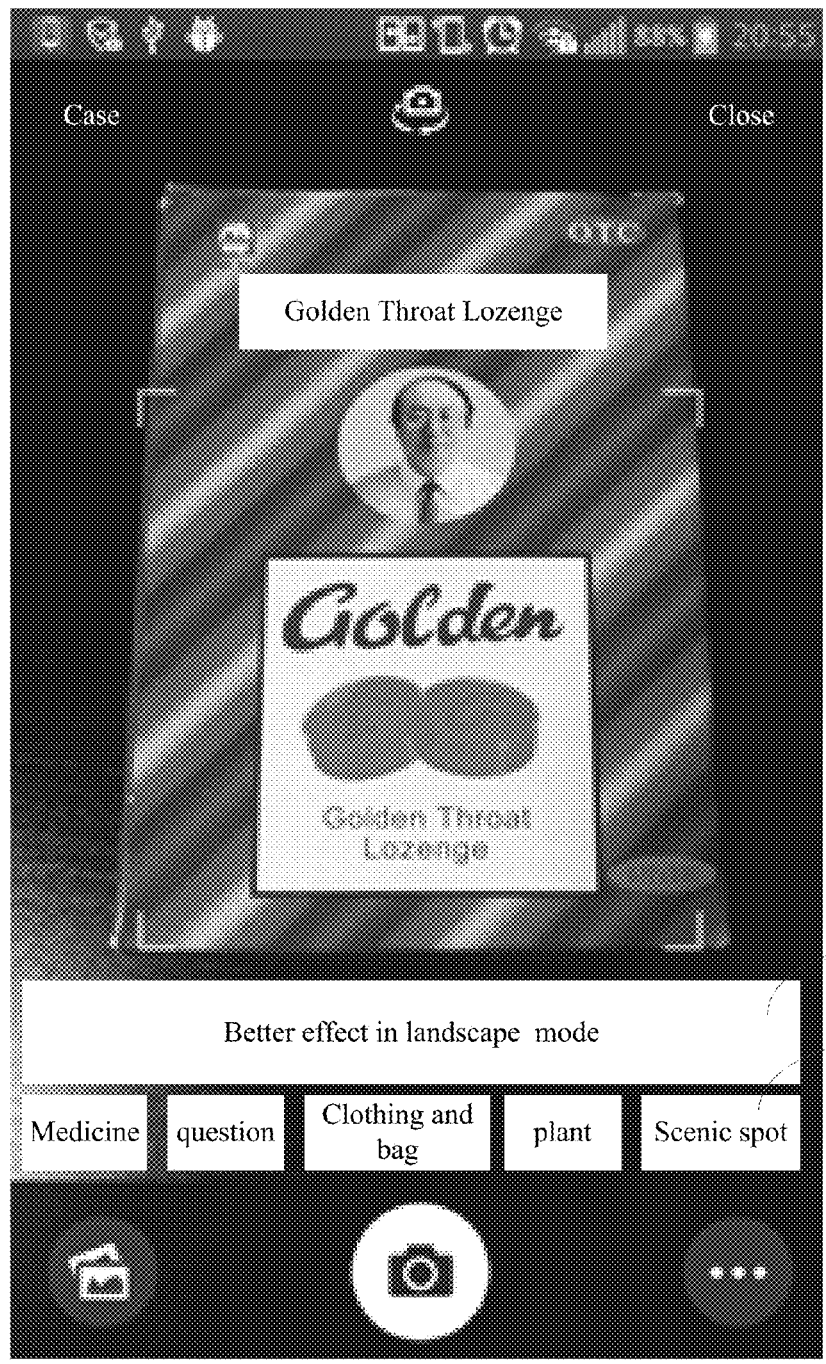
FIG. 4 is a schematic diagram of displaying screen direction guide information according to an embodiment of the present invention.

Assuming that the user clicks the image category option "medicine", further guide information corresponding to the category "medicine" is also displayed in the shooting interface, besides the image category options 41, as shown in FIG. 4.

Optionally, the further guide information includes, but is not limited to, screen direction guide information and gridding guide information.

The screen direction guide information is configured to prompt the user to shoot in a landscape or portrait mode. For example, as shown in FIG. 4, the further guide information is the screen direction guide information 42, and the screen direction guide information 42 particularly is "better effect in landscape mode". By guiding the user to shoot in the landscape mode, the image shot includes more effective information, which facilitates processing the image.

Figure 5:
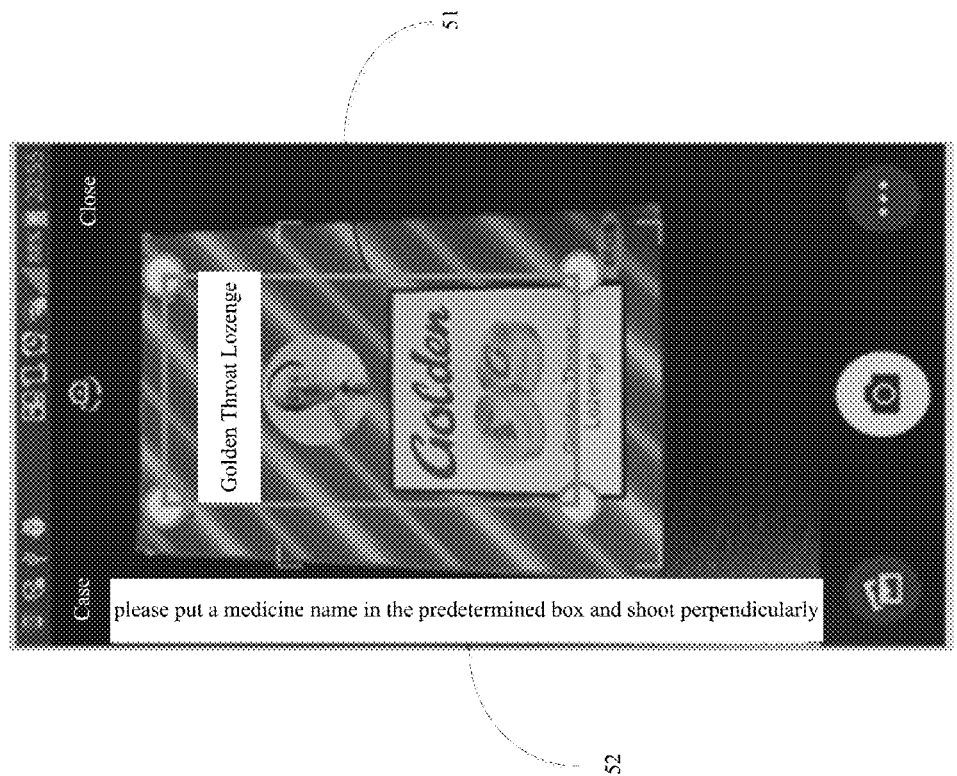
FIG. 5 is a schematic diagram of displaying gridding guide information according to an embodiment of the present invention.

The gridding guide information is configured to prompt the user to put particular content in a preset box. For example, as shown in FIG. 5, the further guide information is the gridding guide information 52, the predetermined box is represented as 51, and the gridding guide information 52 particularly is "please put a medicine name in the predetermined box and shoot perpendicularly". By guiding the user to put the particular content into the predetermined box, a key point of the image can be captured, such that the search result satisfying the requirements of the user can be obtained.

Different kinds of further guide information may be presented at the same time or sequentially. For example, as shown in FIGS. 4 and 5, the screen direction guide information is displayed first, and then the gridding guide information is displayed.

It may be understood that specific content of the guide information, the further guide information, and the image category options are not limited to above embodiments, but may be adjusted according to actual requirements.

In step S12, an image shot according to the guide information is obtained.

For example, when the user wishes to make a search based on an image of the medicine category, the shooting interfaces in FIGS. 3-5 may be displayed to the user in turn according to above guide information. As shown in FIG. 5, the user may click a shooting button in the shooting interface to call a camera unit in the user's mobile terminal, such that the image of the medicine category is obtained, and then the mobile device may send the image of the medicine category to a search engine for information searching.

In step S13, a search result is obtained according to the image shot and the search result is displayed.

After receiving the image sent by a client (i.e., the mobile terminal), the search engine may obtain the search result in general lookup ways.

The search result may be in different categories, according to different categories of the image shot.

Figure 6:
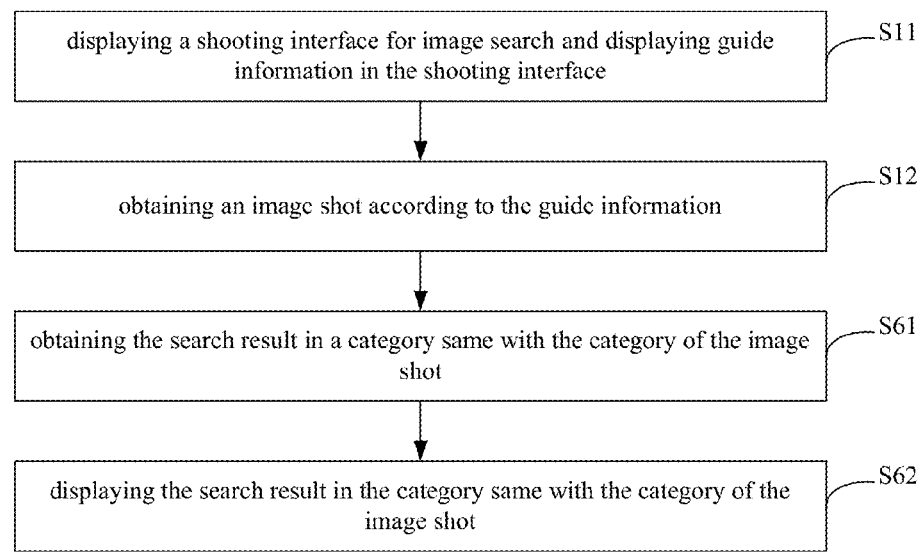
FIG. 6 is a flow chat of a method for information searching according to another embodiment of the present invention.

Optionally, as shown in FIG. 6, obtaining the search result according to the image shot and displaying the search result includes following steps.

In step S61, the search result in a category same with the category of the image shot is obtained.

The search result includes at least one of structured description information, purchase information, a scenic spot website or a customized promotion page.

The structured description information may include, but is not limited to, basic description information, Wikipedia information and detail page. Moreover, the structured description information may be displayed in various forms, including but not limited to, a text form, an image form and a combination thereof.

The purchase information includes, but is not limited to, purchase information about offline shops and purchase information about online shops.

The detail page includes, but is not limited to, a page for resolving a question and a product detail page.

The customized promotion page may be configured as a Baidu connect account, which is an official service account of a merchant in a Baidu mobile platform. Based on mobile search, @account, map, personalized recommendation and other manners, the user may access the merchant's services anytime and anywhere.

In step S62, the search result in the same category as the image shot is displayed to the user.

Figure 7:
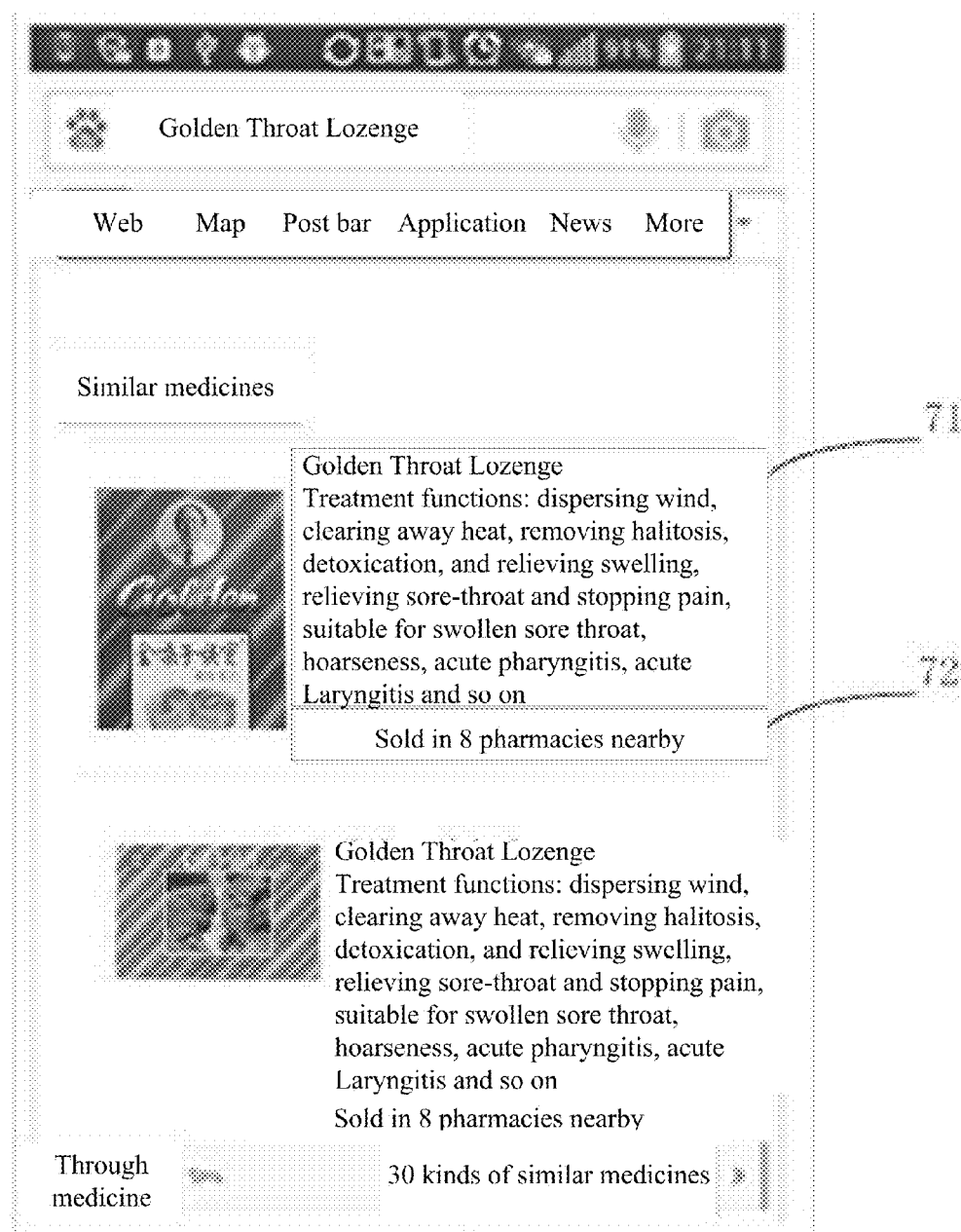
FIGS. 7-14 are schematic diagrams showing search results according to embodiments of the present invention.

For example, as shown in FIG. 7, for the search based on the image of the medicine category, the search result displayed includes basic description information 71 and purchase medicine 72 of the medicine, in which the purchase information 72 includes address information of the offline shop or link information of the online shop.

Figure 8:
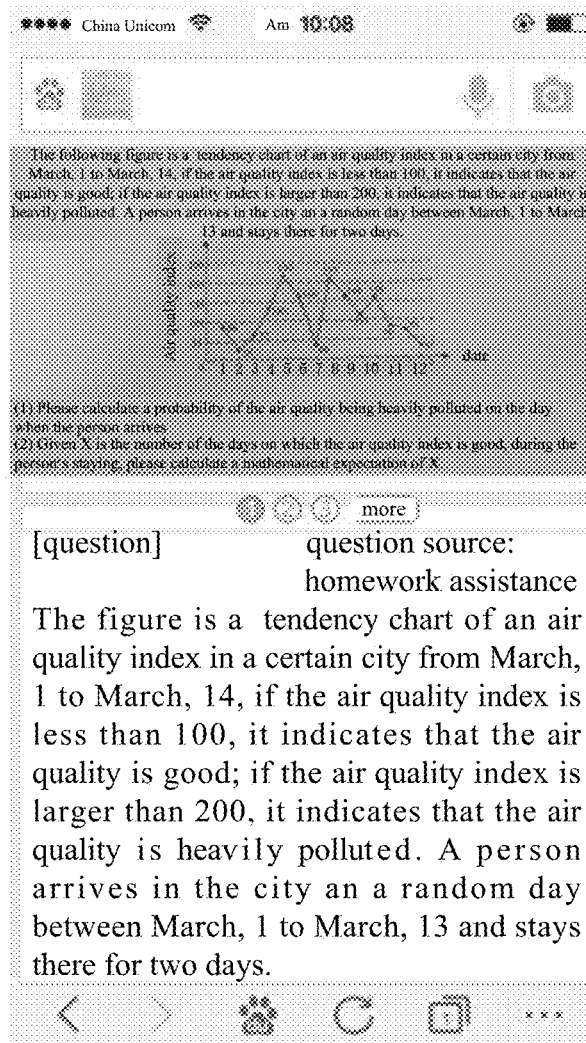
Figure 9:
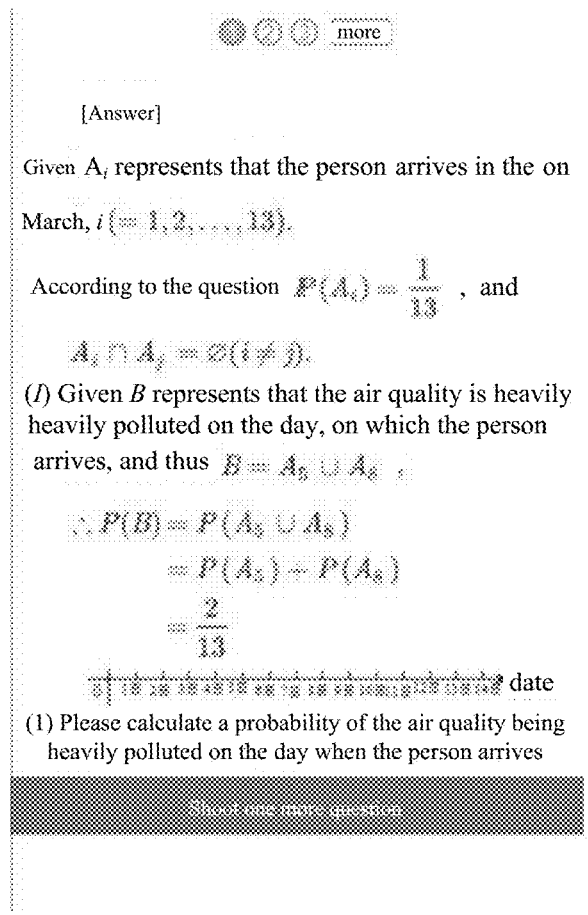

For another example, as shown in FIG. 8, for the search based on an image of a question category, the search result displayed includes a question detail page 81. After entering the question detail page 81, a solution 91 of the question is displayed, as shown in FIG. 9.

Figure 10:
Figure 11:
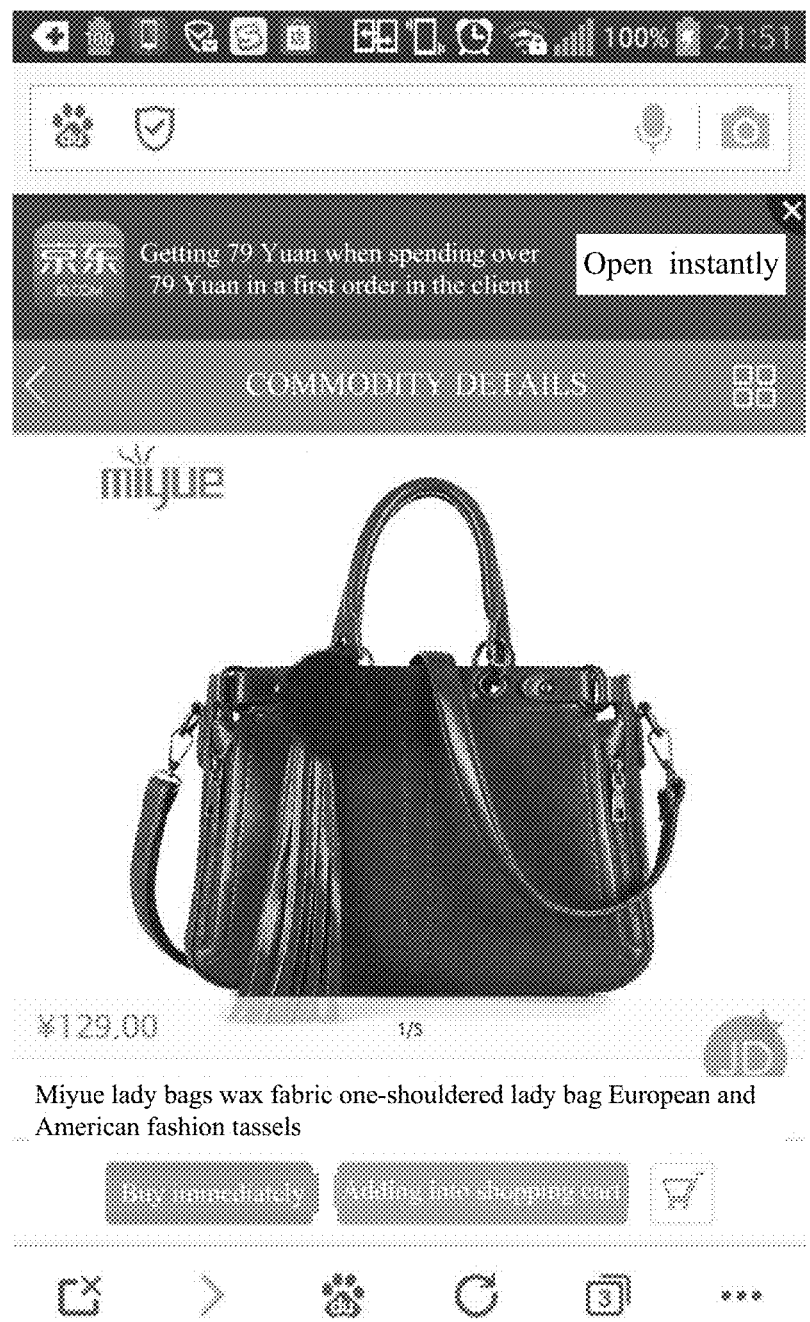

For another example, as shown in FIG. 10, for the search based on an image of a clothing and bag category, the search result displayed includes purchase information 101. When the user clicks the purchase information of a product, a product detail page 111 corresponding to the product is displayed and thus the user may obtain more product description information in the product detail page. Furthermore, the user can also add the product into a shopping cart or buy the product immediately via the product detail page 111.

Figure 12:
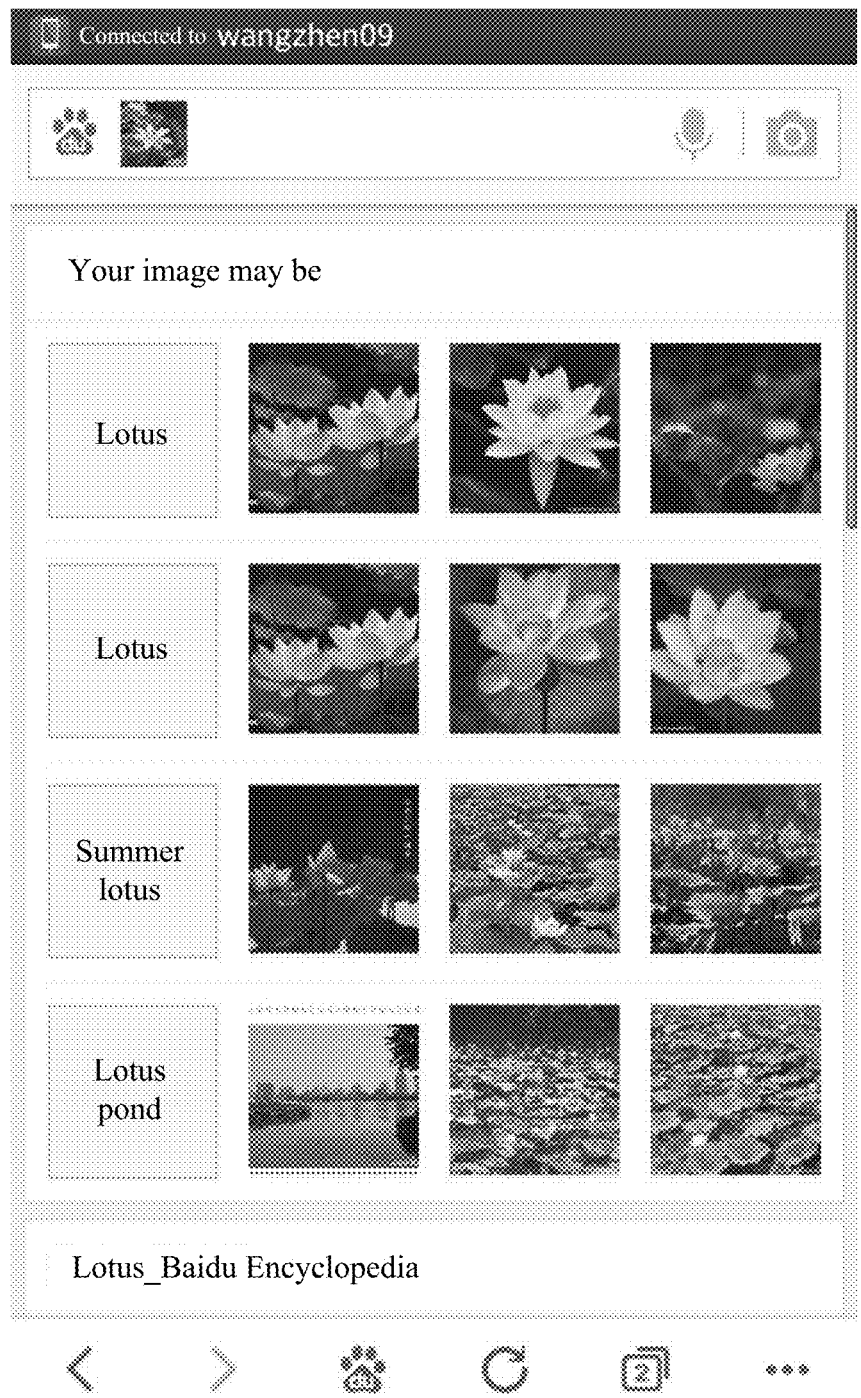
Figure 13:
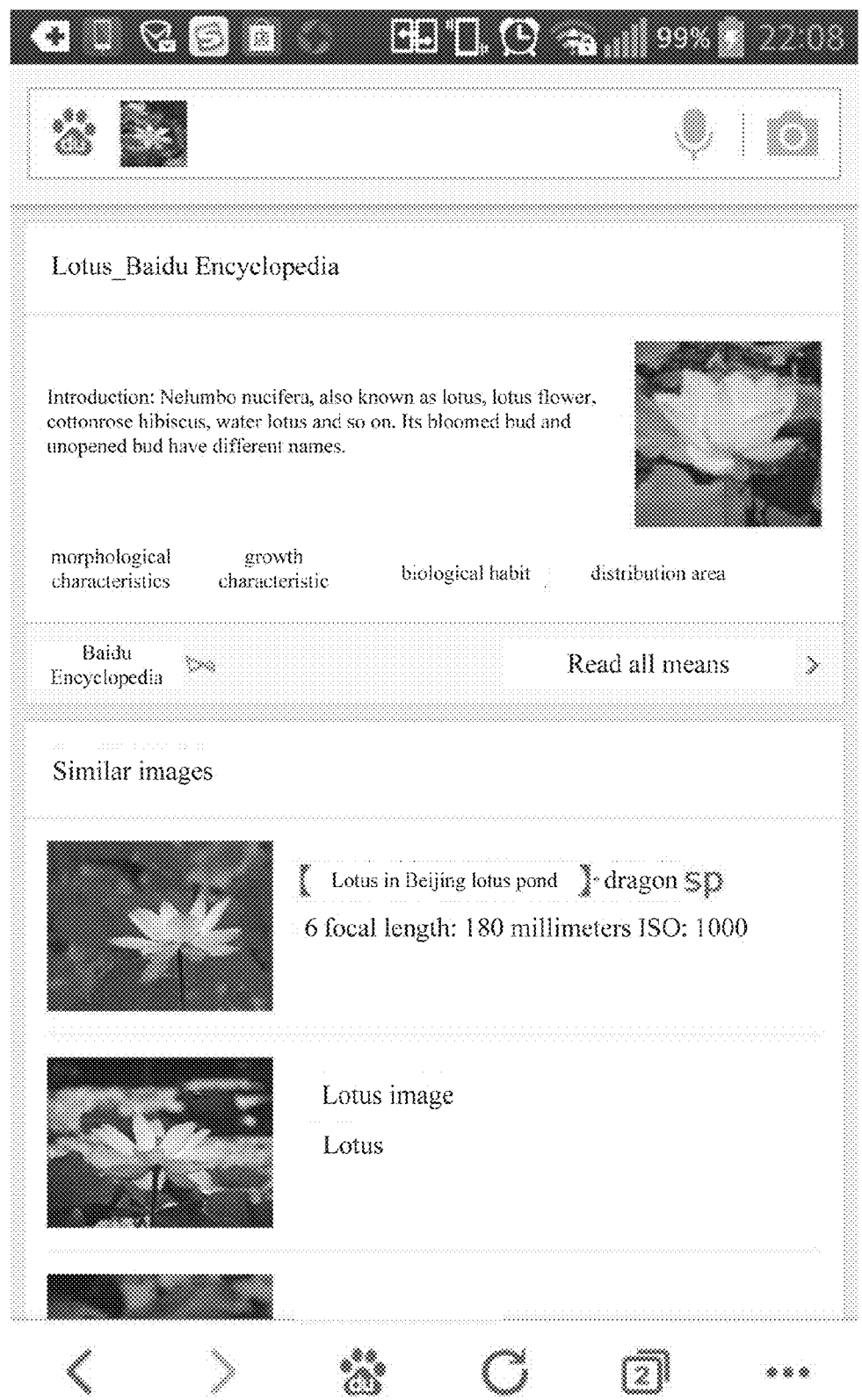

For another example, as shown in FIG. 12, for the search based on an image of a plant category, the search result displayed includes basic description information 121. As shown in FIG. 13, the search result further includes Wikipedia information 131 of the plant.

Figure 14:
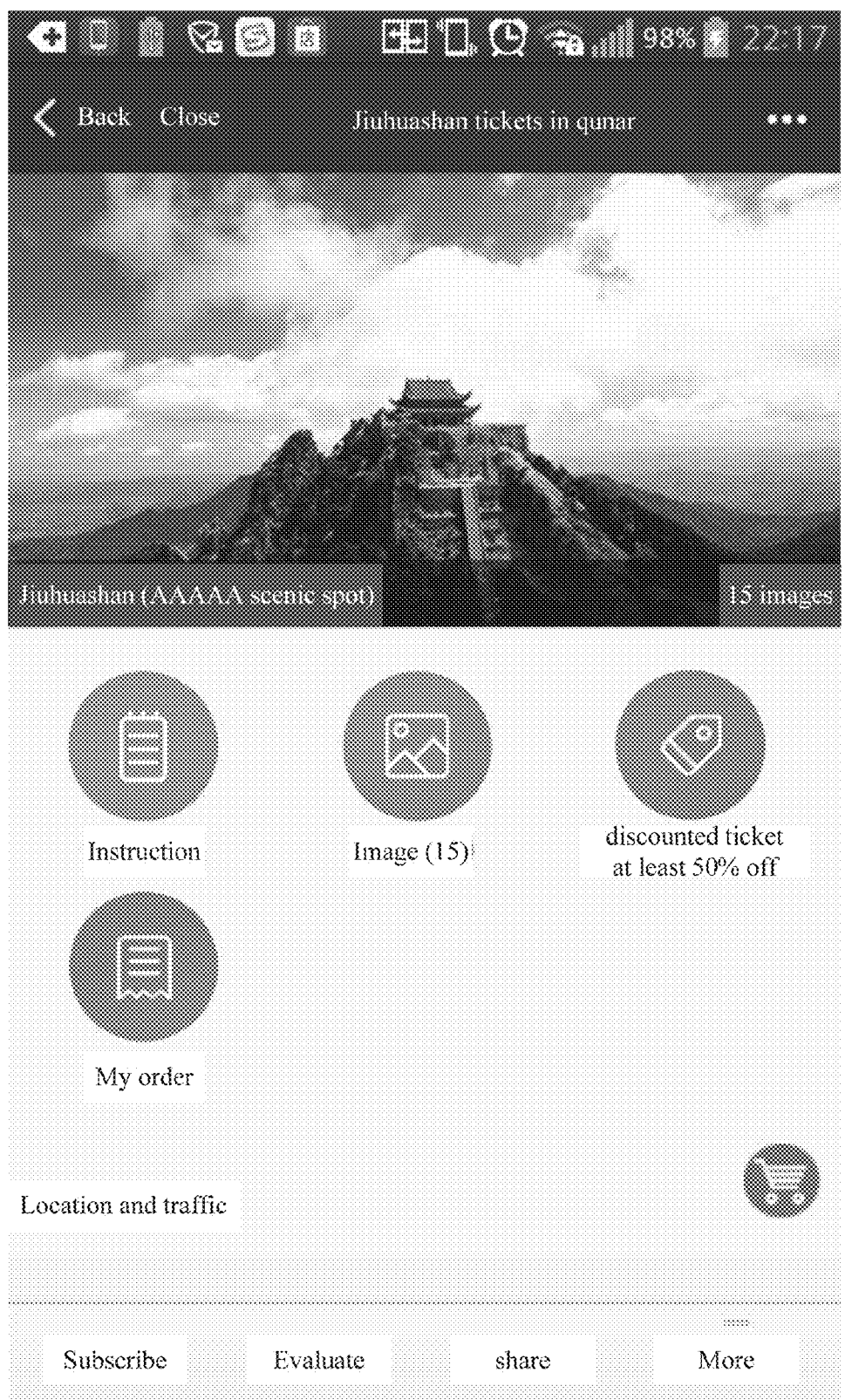

For another example, when a search is made based on an image of a scenic point category, the search result displayed includes a scenic spot website or a customized promotion page. When the user clicks the scenic spot web site or the customized promotion page, scenic spot related information 141 is displayed, as shown in FIG. 14, such that the user can obtain an introduction, traffic information and ticket information of the scenic spot and buy travel tickets online.

It may be understood that only some examples are provided in FIGS. 7-14 and the present invention is not limited to the specific content contained in these examples. For example, in FIG. 7, the search result may be not limited to "Golden Throat Lozenge", and the basic description information corresponding to "Golden Throat Lozenge" may be not limited to the information illustrated in FIG. 7, either.

With the method for information searching according to embodiments of the present invention, by displaying the guide information in the shooting interface, the user can shoot an accurate and effective image according to the guide information, thus improving an accuracy rate of the image search. Furthermore, the search result is obtained according to the image shot, such that the search result in a particular category is displayed to the user, and thus the requirements of the user are better satisfied.

Figure 15:
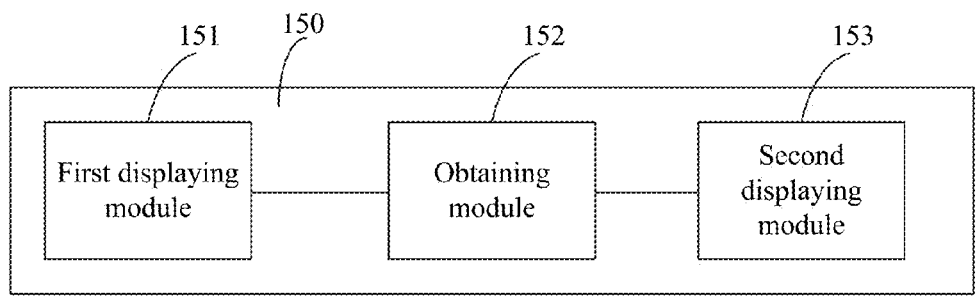
FIG. 15 is a block diagram of an apparatus for information searching according to an embodiment of the present invention.

FIG. 15 is a block diagram of an apparatus for information searching according to an embodiment of the present invention. As shown in FIG. 15, the apparatus includes a first displaying module 151, an obtaining module 152 and a second displaying module 153.

The first displaying module 151 is configured to display a shooting interface for image search and display guide information in the shooting interface.

When the user makes a search, shooting identification information (such as a camera sign) is included in a search box. After the user clicks the shooting identification information, an image search mode is started, and the shooting interface is displayed for the image search.

The image used for search may be an image shot currently. For example, the user may shoot the image via the shooting interface. Or, the image used for search may be an image stored in a photo gallery of the user's mobile terminal. For example, an option button for the photo gallery is included in the shooting interface, and the user can click the option button for selecting the image stored in the photo gallery. In the present embodiment, the image used for search is shot currently.

The guide information displayed by the first displaying module 151 includes, but is not limited to, a category of the image to be shot and further guide information corresponding to the category.

Optionally, the further guide information displayed by the first displaying module 151 includes at least one of screen direction guide information and gridding guide information.

Optionally, the first displaying module 151 may be specifically configured to: display a plurality of image category options; and display the further guide information corresponding to selected image category option after one of the plurality of image category options is selected.

For example, the plurality of image category options may be first displayed in the shooting interface, and then the further guide information corresponding to one of the plurality of image category options is displayed after the user selects one of the plurality of image category options. The user may select one image category option by clicking the image category option.

For example, the further guide information corresponding to each image category option may be pre-configured, such that the corresponding further guide information can be displayed after the user selects one image category option. The further guide information corresponding to different image category options may be identical or different.

As shown in FIG. 3, the plurality of image category options 31 is displayed at the bottom of the shooting interface. In particular, the plurality of image category options includes medicine, question, clothing and bag, plant, and scenic spot.

Assuming that the user clicks the image category option "medicine", further guide information corresponding to the category "medicine" is also displayed in the shooting interface, besides the image category options 41, as shown in FIG. 4.

The screen direction guide information is configured to prompt the user to shoot in a landscape or portrait mode. For example, as shown in FIG. 4, the further guide information is the screen direction guide information 42, and the screen direction guide information 42 particularly is "better effect in landscape mode". By guiding the user to shoot in the landscape mode, the image shot includes more effective information, which facilitates processing the image.

The gridding guide information is configured to prompt the user to put particular content in a preset box. For example, as shown in FIG. 5, the further guide information is the gridding guide information 52, the predetermined box is represented as 51, and the gridding guide information 52 particularly is "please put a medicine name in the predetermined box and shoot perpendicularly". By guiding the user to put the particular content into the predetermined box, a key point of the image can be captured, such that the search result satisfying the requirements of the user can be obtained.

Different kinds of further guide information may be presented at the same time or sequentially. For example, as shown in FIGS. 4 and 5, the screen direction guide information is displayed first, and then the gridding guide information is displayed.

It may be understood that specific content of the guide information, the further guide information, and the image category options are not limited to above embodiments, but may be adjusted according to actual requirements.

The obtaining module 152 is configured to obtain an image shot according to the guide information, and to obtain a search result according to the image shot.

For example, when the user wishes to make a search based on an image of the medicine category, the shooting interfaces in FIGS. 3-5 may be displayed to the user in turn according to above guide information. As shown in FIG. 5, the user may click a shooting button in the shooting interface to call a camera unit in the user's mobile terminal, such that the image of the medicine category is obtained, and then the mobile device may send the image of the medicine category to a search engine for information searching.

After receiving the image sent by a client (i.e., the mobile terminal), the search engine may obtain the search result in general lookup ways.

The search result may be in different categories, according to different categories of the image shot.

Optionally, the obtaining module 152 is specifically configured to obtain the search result in a category same with a category of the image shot, in which the search result includes at least one of structured description information, purchase information, a scenic spot website and a customized promotion page.

The structured description information may include, but is not limited to, basic description information, Wikipedia information and detail page. Moreover, the structured description information may be displayed in various forms, including but not limited to, a text form, an image form and a combination thereof.

The purchase information includes, but is not limited to, purchase information about offline shops and purchase information about online shops.

The detail page includes, but is not limited to, a page for resolving a question and a product detail page.

The customized promotion page may be configured as a Baidu connect account, which is an official service account of a merchant in a Baidu mobile platform. Based on mobile search, @account, map, personalized recommendation and other manners, the user may access the merchant's services anytime and anywhere.

For example, as shown in FIG. 7, for the search based on the image of the medicine category, the search result displayed includes basic description information 71 and purchase medicine 72 of the medicine, in which the purchase information 72 includes address information of the offline shop or link information of the online shop.

For another example, as shown in FIG. 8, for the search based on an image of a question category, the search result displayed includes a question detail page 81. After entering the question detail page 81, a solution 91 of the question is displayed, as shown in FIG. 9.

For another example, as shown in FIG. 10, for the search based on an image of a clothing and bag category, the search result displayed includes purchase information 101. When the user clicks the purchase information of a product, a product detail page 111 corresponding to the product is displayed and thus the user may obtain more product description information in the product detail page. Furthermore, the user can also add the product into a shopping cart or buy the product immediately via the product detail page 111.

For another example, as shown in FIG. 12, for the search based on an image of a plant category, the search result displayed includes basic description information 121. As shown in FIG. 13, the search result further includes Wikipedia information 131 of the plant.

For another example, when a search is made based on an image of a scenic point category, the search result displayed includes a scenic spot website or a customized promotion page. When the user clicks the scenic spot web site or the customized promotion page, scenic spot related information 141 is displayed, as shown in FIG. 14, such that the user can obtain an introduction, traffic information and ticket information of the scenic spot and buy travel tickets online.

It may be understood that only some examples are provided in FIGS. 7-14 and the present invention is not limited to the specific content contained in these examples. For example, in FIG. 7, the search result may be not limited to "Golden Throat Lozenge", and the basic description information corresponding to "Golden Throat Lozenge" may be not limited to the information illustrated in FIG. 7, either.

The second displaying module 153 is configured to display the search result. In particular, the second displaying module 153 is configured to display the search result in the category same with the category of the image shot to the user.

With the apparatus for information searching according to embodiments of the present invention, by displaying the guide information in the shooting interface, the user can shoot an accurate and effective image according to the guide information, thus improving an accuracy rate of the image search. Furthermore, the search result is obtained according to the image shot, such that the search result in a particular category is displayed to the user, and thus the requirements of the user are better satisfied.

The present invention also provides a non-transitory computer readable storage medium having stored therein instructions that, when executed by a processor of a mobile terminal, causes the mobile terminal to perform the above method for information searching.

It should be noted that, terms such as "first" and "second" are used herein for purposes of description and are not intended to indicate or imply relative importance or significance. Furthermore, in the description of the present disclosure, "a plurality of" relates to two or more than two.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A method for information searching, comprising:
displaying a shooting interface for image search, and displaying guide information in the shooting interface;
obtaining an image shot according to the guide information; and
obtaining a search result according to the image shot and displaying the search result, wherein,
the guide information comprises at least one of a category of the image to be shot and further guide information corresponding to category;
the further guide information comprises at least one of screen direction guide information and gridding guide information; and
the screen direction guide information is configured to prompt the user to shoot in a landscape or portrait mode;
obtaining the search result according to the image shot and displaying the search result comprises:
obtaining the search result in a category same with the category of the image shot, in which the search result comprises at least one of purchase information and a customized promotion page; and
displaying the search result in the category same with the category of the image shot.

2. The method according to claim 1, wherein displaying guide information in the shooting interface comprises:
displaying a plurality of image category options in the shooting interface; and
displaying the further guide information corresponding to selected image category option, after one of the plurality of image category options is selected.

3. The method according to claim 1, wherein
the search result further comprises at least one of structured description information and a scenic spot website.

4. An apparatus for information searching, comprising:
a processor; and
a memory, configured to store instructions executable by the processor,
wherein the processor is configured to:
display a shooting interface for image search, and display guide information in the shooting interface;
obtain an image shot according to the guide information;
obtain a search result according to the image shot; and
display the search result,
in which,
the guide information comprises at least one of a category of the image to be shot and further guide information corresponding to the category;
the further guide information comprises at least one of screen direction guide information and gridding guide information; and
the screen direction guide information is configured to prompt the user to shoot in a landscape or portrait mode;
the processor is configured to obtain the search result in a category same with the category of the image shot, in which the search result comprises at least one of purchase information and a customized promotion page; and
display the search result in the category same with the category of the image shot.

5. The apparatus according to claim 4, wherein the processor is configured to:
display a plurality of image category options; and
display the further guide information corresponding to selected image category option, after one of the plurality of image category options is selected.

6. The apparatus according to claim 4, wherein
the search result comprises at least one of structured description information and a scenic spot website.

7. A non-transitory computer readable storage medium having stored therein instructions that, when executed by a processor of a mobile terminal, causes the mobile terminal to perform a method for information searching, the method comprising:
displaying a shooting interface for image search, and displaying guide information in the shooting interface;
obtaining an image shot according to the guide information; and
obtaining a search result according to the image shot and displaying the search result,
in which,
the guide information comprises at least one of a category of the image to be shot and further guide information corresponding to the category;
the further guide information comprises at least one of screen direction guide information and gridding guide information; and
the screen direction guide information is configured to prompt the user to shoot in a landscape or portrait mode;
obtaining the search result according to the image shot and displaying the search result comprises:
obtaining the search result in a category same with the category of the image shot, in which the search result comprises at least one of purchase information and a customized promotion page; and
displaying the search result in the category same with the category of the image shot.

* * * * *